US010099147B2

(12) United States Patent
Mallinson et al.

(10) Patent No.: US 10,099,147 B2
(45) Date of Patent: Oct. 16, 2018

(54) USING A PORTABLE DEVICE TO INTERFACE WITH A VIDEO GAME RENDERED ON A MAIN DISPLAY

(71) Applicant: Sony Interactive Entertainment Inc., Tokyo (JP)

(72) Inventors: Dominic S. Mallinson, San Mateo, CA (US); Richard L. Marks, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 1305 days.

(21) Appl. No.: 14/042,631

(22) Filed: Sep. 30, 2013

(65) Prior Publication Data

US 2014/0031120 A1     Jan. 30, 2014

Related U.S. Application Data

(63) Continuation of application No. 10/922,514, filed on Aug. 19, 2004, now Pat. No. 8,547,401.

(51) Int. Cl.
*A63F 9/24* (2006.01)
*A63F 13/00* (2014.01)
(Continued)

(52) U.S. Cl.
CPC .............. *A63F 13/92* (2014.09); *A63F 13/00* (2013.01); *A63F 13/02* (2013.01); *A63F 13/04* (2013.01);
(Continued)

(58) Field of Classification Search
CPC ........ G07F 17/32; A63F 13/92; A63F 13/213; A63F 13/22; A63F 13/65
(Continued)

(56) References Cited

U.S. PATENT DOCUMENTS 3,943,277 A   3/1976 Everly et al.
4,263,504 A   4/1981 Thomas
(Continued)

FOREIGN PATENT DOCUMENTS

EP    0353200 A2   1/1990
EP    0652686 A1   5/1995
(Continued)

OTHER PUBLICATIONS

Kato et al., "Virtual Object Manipulation on a Table-Top AR Environment", 2000 IEEE, pp. 111-119, Hiroshima City University, Japan; kata@sys.im.hiroshima-cu.ac.jp . University of Washing, Seattle, WA; and ATD MIC Laboratories, ATR International, Kyoto, Japan.

(Continued)

*Primary Examiner* — Omkar Deodhar
*Assistant Examiner* — Wei Lee
(74) *Attorney, Agent, or Firm* — Martine Penilla Group, LLP

(57) ABSTRACT

A method for interfacing with a video game is provided, including: rendering display data on a main display, the display data defining a scene rendered by the video game, the display data being configured to include a visual cue; capturing the display data by an image capture device incorporated into a portable device; analyzing the captured display data to identify the visual cue; in response to identification of the visual cue, determining additional information that is in addition to the scene of the video game that is displayed on the main display, the additional information defining graphics or text to be added to the scene of the video game; presenting the additional information on a personal display incorporated into the portable device, the presentation of the additional information being synchronized to the rendering of the display data on the main display.

27 Claims, 9 Drawing Sheets

(51) Int. Cl.
| | |
|---|---|
| *G07F 17/00* | (2006.01) |
| *G07F 19/00* | (2006.01) |
| *A63F 13/92* | (2014.01) |
| *A63F 13/213* | (2014.01) |
| *A63F 13/65* | (2014.01) |
| *A63F 13/22* | (2014.01) |
| *A63F 13/98* | (2014.01) |
| *A63F 13/219* | (2014.01) |
| *G06F 1/16* | (2006.01) |
| *G06F 3/01* | (2006.01) |
| *H04N 1/00* | (2006.01) |
| *G06T 19/00* | (2011.01) |
| *H04W 4/04* | (2009.01) |

(52) U.S. Cl.
CPC ............ *A63F 13/213* (2014.09); *A63F 13/22* (2014.09); *A63F 13/65* (2014.09); *G06F 1/1626* (2013.01); *G06F 1/1632* (2013.01); *G06F 1/1686* (2013.01); *G06F 3/011* (2013.01); *G06T 19/006* (2013.01); *H04N 1/00323* (2013.01); *H04W 4/043* (2013.01); *A63F 2300/1087* (2013.01)

(58) Field of Classification Search
USPC .......................................................... 463/31
See application file for complete search history.

(56) References Cited

U.S. PATENT DOCUMENTS

| | | | |
|---|---|---|---|
| 4,313,227 A | 1/1982 | Eder | |
| 4,558,864 A | 12/1985 | Medwedeff | |
| 4,565,999 A | 1/1986 | King et al. | |
| 4,802,227 A | 1/1989 | Elko et al. | |
| 4,823,001 A | 4/1989 | Kobayashi et al. | |
| 4,843,568 A | 6/1989 | Krueger et al. | |
| 5,034,986 A | 7/1991 | Karmann et al. | |
| 5,055,840 A | 10/1991 | Bartlett | |
| 5,111,401 A | 5/1992 | Everett, Jr. et al. | |
| 5,144,594 A | 9/1992 | Gilchrist | |
| 5,195,179 A | 3/1993 | Tokunaga | |
| 5,260,556 A | 11/1993 | Lake et al. | |
| 5,297,061 A | 3/1994 | Dementhon et al. | |
| 5,335,011 A | 8/1994 | Addeo et al. | |
| 5,365,048 A | 11/1994 | Komiya | |
| 5,394,168 A | 2/1995 | Smith, III et al. | |
| 5,426,450 A | 6/1995 | Drumm | |
| 5,435,554 A | 7/1995 | Lipson | |
| 5,455,685 A | 10/1995 | Mori | |
| 5,473,701 A | 12/1995 | Cezanne et al. | |
| 5,485,273 A | 1/1996 | Mark et al. | |
| 5,534,917 A | 7/1996 | MacDougall | |
| 5,543,818 A | 8/1996 | Scott | |
| 5,557,684 A | 9/1996 | Wang et al. | |
| 5,563,988 A | 10/1996 | Maes et al. | |
| 5,568,928 A | 10/1996 | Munson et al. | |
| 5,581,276 A | 12/1996 | Cipolla et al. | |
| 5,583,478 A | 12/1996 | Renzi | |
| 5,586,231 A | 12/1996 | Florent et al. | |
| 5,611,731 A | 3/1997 | Bouton et al. | |
| 5,616,078 A | 4/1997 | Oh | |
| 5,638,228 A | 6/1997 | Thomas, III | |
| 5,649,021 A | 7/1997 | Matey et al. | |
| 5,675,825 A | 10/1997 | Dreyer et al. | |
| 5,675,828 A | 10/1997 | Stoel et al. | |
| 5,677,710 A | 10/1997 | Thompson-Rohrlich | |
| 5,706,364 A | 1/1998 | Kopec et al. | |
| 5,768,415 A | 6/1998 | Jagadish et al. | |
| 5,796,354 A | 8/1998 | Cartabiano et al. | |
| 5,818,424 A | 10/1998 | Korth | |
| 5,846,086 A | 12/1998 | Bizzi et al. | |
| 5,850,222 A | 12/1998 | Cone | |
| 5,850,473 A | 12/1998 | Andersson | |
| 5,861,910 A | 1/1999 | McGarry et al. | |
| 5,870,100 A | 2/1999 | DeFreitas | |
| 5,913,727 A | 6/1999 | Ahdoot | |
| 5,914,723 A | 6/1999 | Gajewska | |
| 5,917,493 A | 6/1999 | Tan et al. | |
| 5,923,306 A | 7/1999 | Smith et al. | |
| 5,923,318 A | 7/1999 | Zhai et al. | |
| 5,929,444 A | 7/1999 | Leichner | |
| 5,930,383 A | 7/1999 | Netzer | |
| 5,930,741 A | 7/1999 | Kramer | |
| 5,937,081 A | 8/1999 | O'Brill et al. | |
| 5,959,596 A | 9/1999 | McCarten et al. | |
| 5,963,250 A | 10/1999 | Parker et al. | |
| 5,978,722 A | 11/1999 | Takasuka et al. | |
| 5,993,314 A | 11/1999 | Dannenberg et al. | |
| 6,009,210 A | 12/1999 | Kang | |
| 6,021,219 A | 2/2000 | Andersson et al. | |
| 6,031,545 A | 2/2000 | Ellenby et al. | |
| 6,031,934 A | 2/2000 | Ahmad et al. | |
| 6,037,942 A | 3/2000 | Millington | |
| 6,044,181 A | 3/2000 | Szeliski et al. | |
| 6,049,619 A | 4/2000 | Anandan et al. | |
| 6,056,640 A | 5/2000 | Schaaij | |
| 6,057,909 A | 5/2000 | Yahav et al. | |
| 6,061,055 A | 5/2000 | Marks | |
| 6,075,895 A | 6/2000 | Qiao et al. | |
| 6,078,789 A | 6/2000 | Bodenmann et al. | |
| 6,091,905 A | 7/2000 | Yahav et al. | |
| 6,094,625 A | 7/2000 | Ralston | |
| 6,097,369 A | 8/2000 | Wambach | |
| 6,100,517 A | 8/2000 | Yahav et al. | |
| 6,100,895 A | 8/2000 | Miura et al. | |
| 6,101,289 A | 8/2000 | Kellner | |
| 6,115,052 A | 9/2000 | Freeman et al. | |
| 6,134,346 A | 10/2000 | Berman et al. | |
| 6,144,367 A | 11/2000 | Berstis | |
| 6,151,009 A | 11/2000 | Kanade et al. | |
| 6,160,540 A | 12/2000 | Fishkin et al. | |
| 6,166,744 A | 12/2000 | Jaszlics et al. | |
| 6,173,059 B1 | 1/2001 | Huang et al. | |
| 6,175,343 B1 | 1/2001 | Mitchell et al. | |
| 6,184,863 B1 | 2/2001 | Sibert et al. | |
| 6,191,773 B1 | 2/2001 | Maruno et al. | |
| 6,195,104 B1 | 2/2001 | Lyons | |
| 6,215,898 B1 | 4/2001 | Woodfill et al. | |
| 6,243,491 B1 | 6/2001 | Andersson | |
| 6,267,678 B1 * | 7/2001 | Kubo .................. A63F 13/12 463/11 |
| 6,275,213 B1 | 8/2001 | Tremblay et al. | |
| 6,281,930 B1 | 8/2001 | Parker et al. | |
| 6,282,362 B1 | 8/2001 | Murphy et al. | |
| 6,295,064 B1 | 9/2001 | Yamaguchi | |
| 6,297,838 B1 | 10/2001 | Chang et al. | |
| 6,304,267 B1 | 10/2001 | Sata | |
| 6,307,549 B1 | 10/2001 | King et al. | |
| 6,307,568 B1 | 10/2001 | Rom | |
| 6,323,839 B1 | 11/2001 | Fukuda et al. | |
| 6,323,942 B1 | 11/2001 | Bamji | |
| 6,326,901 B1 | 12/2001 | Gonzales | |
| 6,327,073 B1 | 12/2001 | Yahav et al. | |
| 6,331,911 B1 | 12/2001 | Manassen et al. | |
| 6,346,929 B1 | 2/2002 | Fukushima et al. | |
| 6,351,661 B1 | 2/2002 | Cosman | |
| 6,371,849 B1 | 4/2002 | Togami | |
| 6,392,644 B1 | 5/2002 | Miyata et al. | |
| 6,394,897 B1 | 5/2002 | Togami | |
| 6,400,374 B2 | 6/2002 | Lanier | |
| 6,409,602 B1 | 6/2002 | Wiltshire et al. | |
| 6,411,392 B1 | 6/2002 | Bender et al. | |
| 6,411,744 B1 | 6/2002 | Edwards | |
| 6,417,836 B1 | 7/2002 | Kumar et al. | |
| 6,435,969 B1 | 8/2002 | Tanaka et al. | |
| 6,441,825 B1 | 8/2002 | Peters | |
| 6,473,516 B1 | 10/2002 | Kawaguchi et al. | |
| 6,498,860 B1 | 12/2002 | Sasaki et al. | |
| 6,504,535 B1 | 1/2003 | Edmark | |
| 6,516,466 B1 | 2/2003 | Jackson | |
| 6,519,359 B1 | 2/2003 | Nafis et al. | |
| 6,533,420 B1 | 3/2003 | Eichenlaub | |

(56) References Cited

U.S. PATENT DOCUMENTS

| | | |
|---|---|---|
| 6,542,927 B2 | 4/2003 | Rhoads |
| 6,545,706 B1 | 4/2003 | Edwards et al. |
| 6,546,153 B1 | 4/2003 | Hoydal |
| 6,556,704 B1 | 4/2003 | Chen |
| 6,577,748 B2 | 6/2003 | Chang |
| 6,580,414 B1 | 6/2003 | Wergen et al. |
| 6,580,415 B1 | 6/2003 | Kato et al. |
| 6,587,573 B1 | 7/2003 | Starn et al. |
| 6,587,835 B1 | 7/2003 | Treyz et al. |
| 6,593,956 B1 | 7/2003 | Potts et al. |
| 6,621,938 B1 | 9/2003 | Tanaka et al. |
| 6,628,265 B2 | 9/2003 | Hwang |
| 6,661,914 B2 | 12/2003 | Dufour |
| 6,674,415 B2 | 1/2004 | Nakamura et al. |
| 6,676,522 B2 | 1/2004 | Rowe et al. |
| 6,677,967 B2 | 1/2004 | Sawano et al. |
| 6,677,987 B1 | 1/2004 | Girod |
| 6,709,108 B2 | 3/2004 | Levine et al. |
| 6,712,703 B2 | 3/2004 | Miyamoto et al. |
| 6,720,949 B1 | 4/2004 | Pryor et al. |
| 6,727,988 B2 | 4/2004 | Kim et al. |
| 6,741,741 B2 | 5/2004 | Farrell |
| 6,746,124 B2 | 6/2004 | Fischer et al. |
| 6,751,338 B1 | 6/2004 | Wallack |
| 6,753,849 B1 | 6/2004 | Curran et al. |
| 6,766,956 B1 | 7/2004 | Boylan, III et al. ..... 235/462.45 |
| 6,767,282 B2 | 7/2004 | Matsuyama et al. |
| 6,769,769 B2 | 8/2004 | Podoleanu et al. |
| 6,772,057 B2 | 8/2004 | Breed et al. |
| 6,774,939 B1 | 8/2004 | Peng |
| 6,785,329 B1 | 8/2004 | Pan et al. |
| 6,789,967 B1 | 9/2004 | Forester |
| 6,791,531 B1 | 9/2004 | Johnston et al. |
| 6,795,068 B1 | 9/2004 | Marks |
| 6,809,776 B1 | 10/2004 | Simpson |
| 6,819,318 B1 | 11/2004 | Geng |
| 6,847,311 B2 | 1/2005 | Li |
| 6,863,609 B2 | 3/2005 | Okuda et al. |
| 6,870,526 B2 | 3/2005 | Zngfet et al. |
| 6,873,747 B2 | 3/2005 | Askary |
| 6,881,147 B2 | 4/2005 | Naghi et al. |
| 6,884,171 B2 | 4/2005 | Eck et al. |
| 6,890,262 B2 | 5/2005 | Oishi et al. |
| 6,917,688 B2 | 7/2005 | Yu et al. |
| 6,919,824 B2 | 7/2005 | Lee |
| 6,924,787 B2 | 8/2005 | Kramer et al. |
| 6,928,180 B2 | 8/2005 | Stam et al. |
| 6,930,725 B1 | 8/2005 | Hayashi |
| 6,931,596 B2 | 8/2005 | Gutta et al. |
| 6,943,776 B2 | 9/2005 | Ehrenburg |
| 6,945,653 B2 | 9/2005 | Kobori et al. |
| 6,951,515 B2 | 10/2005 | Ohshima et al. |
| 6,952,198 B2 | 10/2005 | Hansen |
| 6,965,362 B1 | 11/2005 | Ishizuka |
| 6,970,183 B1 | 11/2005 | Monroe |
| 6,990,639 B2 | 1/2006 | Wilson |
| 7,006,009 B2 | 2/2006 | Newman |
| 7,016,411 B2 | 3/2006 | Azuma et al. |
| 7,016,532 B2 | 3/2006 | Boncyk et al. |
| 7,039,199 B2 | 5/2006 | Rui |
| 7,039,253 B2 | 5/2006 | Matsuoka et al. |
| 7,042,440 B2 | 5/2006 | Pryor et al. |
| 7,043,056 B2 | 5/2006 | Edwards et al. |
| 7,054,452 B2 | 5/2006 | Ukita |
| 7,059,962 B2 | 6/2006 | Watashiba |
| 7,061,507 B1 | 6/2006 | Tuomi et al. |
| 7,071,914 B1 | 7/2006 | Marks |
| 7,084,887 B1 | 8/2006 | Sato et al. |
| 7,090,352 B2 | 8/2006 | Kobor et al. |
| 7,098,891 B1 | 8/2006 | Pryor |
| 7,102,615 B2 | 9/2006 | Marks |
| 7,106,366 B2 | 9/2006 | Parker et al. |
| 7,113,635 B2 | 9/2006 | Robert et al. |
| 7,116,330 B2 | 10/2006 | Marshall et al. |
| 7,116,342 B2 | 10/2006 | Dengler et al. |
| 7,121,946 B2 | 10/2006 | Paul et al. |
| 7,139,767 B1 | 11/2006 | Taylor et al. |
| 7,148,922 B2 | 12/2006 | Shimada |
| 7,156,311 B2 | 1/2007 | Attia et al. |
| 7,164,413 B2 | 1/2007 | Davis et al. |
| 7,174,312 B2 | 2/2007 | Harper et al. |
| 7,183,929 B1 | 2/2007 | Antebi et al. |
| 7,212,308 B2 | 5/2007 | Morgan |
| 7,223,173 B2 | 5/2007 | Masuyama et al. |
| 7,224,384 B1 | 5/2007 | Iddan et al. |
| 7,227,526 B2 | 6/2007 | Hildreth et al. |
| 7,227,976 B1 | 6/2007 | Jung et al. |
| 7,245,273 B2 | 7/2007 | Eberl et al. |
| 7,259,375 B2 | 8/2007 | Tichit et al. |
| 7,263,462 B2 | 8/2007 | Funge et al. |
| 7,274,305 B1 | 9/2007 | Lutrell |
| 7,283,679 B2 | 10/2007 | Okada et al. |
| 7,296,007 B1 | 11/2007 | Funge et al. |
| 7,301,530 B2 | 11/2007 | Lee et al. |
| 7,301,547 B2 | 11/2007 | Martins et al. |
| 7,305,114 B2 | 12/2007 | Wolff et al. |
| 7,346,387 B1 | 3/2008 | Wachter et al. |
| 7,352,359 B2 | 4/2008 | Zalewski et al. |
| 7,364,297 B2 | 4/2008 | Goldfain et al. |
| 7,379,559 B2 | 5/2008 | Wallace et al. |
| 7,391,409 B2 | 6/2008 | Zalewski et al. |
| 7,436,887 B2 | 10/2008 | Yeredor et al. |
| 7,446,650 B2 | 11/2008 | Schofield et al. |
| 7,545,926 B2 | 6/2009 | Mao |
| 7,555,157 B2 | 6/2009 | Davidson et al. |
| 7,558,698 B2 | 7/2009 | Funge et al. |
| 7,613,610 B1 | 11/2009 | Zimmerman et al. |
| 7,623,115 B2 | 11/2009 | Marks |
| 7,627,139 B2 | 12/2009 | Marks et al. |
| 7,636,645 B1 | 12/2009 | Yen et al. |
| 7,636,697 B1 | 12/2009 | Dobson et al. |
| 7,636,701 B2 | 12/2009 | Funge et al. |
| 7,646,372 B2 | 1/2010 | Marks et al. |
| 7,665,041 B2 | 2/2010 | Wilson et al. |
| 7,697,700 B2 | 4/2010 | Mao |
| 7,721,231 B2 | 5/2010 | Wilson |
| 2001/0056477 A1 | 12/2001 | McTernan et al. |
| 2002/0010655 A1 | 1/2002 | Kjallstrom |
| 2002/0010734 A1 | 1/2002 | Ebersole et al. |
| 2002/0023027 A1 | 2/2002 | Simonds |
| 2002/0036617 A1 | 3/2002 | Pryor |
| 2002/0056114 A1 | 5/2002 | Fillebrown et al. |
| 2002/0072414 A1 | 6/2002 | Stylinski et al. |
| 2002/0075281 A1 | 6/2002 | Vetterli et al. ................ 345/632 |
| 2002/0075282 A1 | 6/2002 | Vetterli et al. ................ 345/632 |
| 2002/0075286 A1 | 6/2002 | Yonezawa et al. |
| 2002/0083461 A1 | 6/2002 | Hutcheson et al. |
| 2002/0085097 A1 | 7/2002 | Colmenarez et al. |
| 2002/0094189 A1 | 7/2002 | Navab et al. |
| 2002/0126898 A1 | 9/2002 | Guo |
| 2002/0126899 A1 | 9/2002 | Farrell |
| 2002/0134151 A1 | 9/2002 | Naruoka et al. |
| 2002/0158873 A1 | 10/2002 | Williamson |
| 2003/0014212 A1 | 1/2003 | Ralston et al. |
| 2003/0022716 A1 | 1/2003 | Park et al. |
| 2003/0063575 A1 | 4/2003 | Kinjo ........................... 370/265 |
| 2003/0093591 A1 | 5/2003 | Hohl |
| 2003/0100363 A1 | 5/2003 | Ali |
| 2003/0111531 A1 | 6/2003 | Williams |
| 2003/0160862 A1 | 8/2003 | Charlier et al. |
| 2003/0189646 A1 | 10/2003 | Bean et al. |
| 2003/0220145 A1* | 11/2003 | Erickson ................ A63F 13/02 463/47 |
| 2003/0232649 A1 | 12/2003 | Gizis et al. |
| 2004/0001082 A1 | 1/2004 | Said |
| 2004/0017355 A1 | 1/2004 | Shim |
| 2004/0035925 A1 | 2/2004 | Wu et al. |
| 2004/0054512 A1 | 3/2004 | Kim et al. |
| 2004/0063480 A1 | 4/2004 | Wang |
| 2004/0063481 A1 | 4/2004 | Wang |
| 2004/0070565 A1 | 4/2004 | Nayar et al. |
| 2004/0087366 A1 | 5/2004 | Shum et al. |
| 2004/0095327 A1 | 5/2004 | Lo |
| 2004/0140955 A1 | 7/2004 | Metz |

(56) References Cited

U.S. PATENT DOCUMENTS

| | | |
|---|---|---|
| 2004/0150728 A1 | 8/2004 | Ogino |
| 2004/0161246 A1* | 8/2004 | Matsushita ............ G06F 3/002 398/187 |
| 2004/0178576 A1 | 9/2004 | Hillis et al. |
| 2004/0189720 A1 | 9/2004 | Wilson et al. |
| 2004/0213419 A1 | 10/2004 | Varma et al. |
| 2004/0227725 A1 | 11/2004 | Calarco et al. |
| 2004/0254017 A1 | 12/2004 | Cheng |
| 2005/0001852 A1 | 1/2005 | Dengler et al. |
| 2005/0011957 A1 | 1/2005 | Attia et al. |
| 2005/0037844 A1 | 2/2005 | Shum et al. |
| 2005/0047611 A1 | 3/2005 | Mao |
| 2005/0088369 A1 | 4/2005 | Yoshioka |
| 2005/0102374 A1 | 5/2005 | Morgane et al. |
| 2005/0105777 A1 | 5/2005 | Kozowlowski, Jr. et al. |
| 2005/0117045 A1 | 6/2005 | Abdellatif et al. |
| 2005/0131776 A1* | 6/2005 | Perotti .............. G06F 17/30867 705/27.2 |
| 2005/0162385 A1 | 7/2005 | Doi et al. |
| 2005/0198095 A1 | 9/2005 | Du et al. |
| 2005/0226431 A1 | 10/2005 | Mao |
| 2005/0239548 A1 | 10/2005 | Ueshima et al. |
| 2006/0001836 A1 | 1/2006 | Kobori et al. |
| 2006/0025222 A1* | 2/2006 | Sekine ................... G07F 17/32 463/42 |
| 2006/0033713 A1 | 2/2006 | Pryor |
| 2006/0035710 A1 | 2/2006 | Festejo et al. |
| 2006/0038819 A1 | 2/2006 | Festejo et al. |
| 2006/0204012 A1 | 9/2006 | Marks et al. |
| 2006/0233389 A1 | 10/2006 | Mao et al. |
| 2006/0250681 A1 | 11/2006 | Park et al. |
| 2006/0252541 A1 | 11/2006 | Zalewski et al. |
| 2006/0252543 A1 | 11/2006 | Van Noland et al. |
| 2006/0264258 A1 | 11/2006 | Zalewski et al. |
| 2006/0264259 A1 | 11/2006 | Zalewski et al. |
| 2006/0264260 A1 | 11/2006 | Zalewski et al. |
| 2006/0269072 A1 | 11/2006 | Mao |
| 2006/0269073 A1 | 11/2006 | Mao |
| 2006/0274032 A1 | 12/2006 | Mao et al. |
| 2006/0274911 A1 | 12/2006 | Mao et al. |
| 2006/0280312 A1 | 12/2006 | Mao |
| 2006/0282873 A1 | 12/2006 | Zalewski et al. |
| 2006/0287084 A1 | 12/2006 | Mao et al. |
| 2006/0287085 A1 | 12/2006 | Mao et al. |
| 2006/0287086 A1 | 12/2006 | Zalewski et al. |
| 2006/0287087 A1 | 12/2006 | Zalewski et al. |
| 2007/0015559 A1 | 1/2007 | Zalewski et al. |
| 2007/0021208 A1 | 1/2007 | Mao et al. |
| 2007/0025562 A1 | 2/2007 | Zalewski et al. |
| 2007/0060336 A1 | 3/2007 | Marks et al. |
| 2007/0061413 A1 | 3/2007 | Larsen et al. |
| 2007/0066394 A1 | 3/2007 | Ikeda et al. |
| 2007/0072675 A1 | 3/2007 | Hamano et al. |
| 2007/0120834 A1 | 5/2007 | Boillot |
| 2007/0120996 A1 | 5/2007 | Boillot |
| 2007/0260340 A1 | 11/2007 | Mao |
| 2007/0260517 A1 | 11/2007 | Zalewski et al. |
| 2007/0261077 A1 | 11/2007 | Zalewski et al. |
| 2008/0056561 A1 | 3/2008 | Sawachi |
| 2008/0070684 A1 | 3/2008 | Haigh-Hutchinson |
| 2008/0091421 A1 | 4/2008 | Gustaysson |
| 2008/0208613 A1 | 8/2008 | Scibora |
| 2009/0010494 A1 | 1/2009 | Bechtel et al. |
| 2009/0016642 A1 | 1/2009 | Hart |
| 2009/0221368 A1 | 9/2009 | Yen et al. |
| 2009/0221374 A1 | 9/2009 | Yen et al. |
| 2009/0288064 A1 | 11/2009 | Yen et al. |
| 2010/0004896 A1 | 1/2010 | Yen et al. |
| 2010/0137064 A1 | 6/2010 | Shum et al. |
| 2012/0212507 A1 | 8/2012 | Vetterli et al. ................ 345/632 |

FOREIGN PATENT DOCUMENTS

| | | |
|---|---|---|
| EP | 750202 A1 | 12/1996 |
| EP | 835676 B1 | 4/1998 |
| EP | 1098686 B1 | 5/2003 |
| EP | 1435258 A2 | 7/2004 |
| FR | 2814965 A1 | 4/2002 |
| GB | 2206716 A | 1/1989 |
| GB | 2376397 A | 12/2002 |
| GB | 2388418 A | 11/2003 |
| JP | 01284897 A | 11/1989 |
| JP | 06102980 A | 4/1994 |
| JP | 7311568 A | 11/1995 |
| JP | 09128141 A | 5/1997 |
| JP | 09185456 A | 7/1997 |
| JP | 1138949 A | 2/1999 |
| JP | 2000172431 A | 6/2000 |
| JP | 2000259856 A | 9/2000 |
| JP | 2000350859 A | 12/2000 |
| JP | 2000356972 A | 12/2000 |
| JP | 2001166676 A | 6/2001 |
| JP | 2002369969 A | 12/2002 |
| JP | 2004-102835 | 4/2004 |
| JP | 2004102835 A | 4/2004 |
| JP | 2004145448 A | 5/2004 |
| JP | 2004254145 A | 9/2004 |
| JP | 2005046422 A | 2/2005 |
| WO | 8805942 A1 | 8/1988 |
| WO | 9848571 A1 | 10/1998 |
| WO | 9926198 A2 | 5/1999 |
| WO | 9935633 A2 | 7/1999 |
| WO | 02027456 A1 | 4/2002 |
| WO | 03079179 A1 | 9/2003 |
| WO | 05073838 A2 | 8/2005 |
| WO | 2005107911 A1 | 11/2005 |
| WO | 2007095082 A2 | 8/2007 |
| WO | 2008056180 A2 | 5/2008 |

OTHER PUBLICATIONS

"The Tracking Cube: A Three-Dimensional Input Device", IBM Technical Disclosure Bulletin, Aug. 1, 1989, pp. 91-95, No. 3B, IBM Corp. New York, U.S.

K. B. Shimoga, et al., "Touch and Force Reflection for Telepresence Surgery", Engineering in Medicine and Biology Opportunities of the IEEEE, Baltimore, MD, USA, Nov. 3, 1994, New York, New York, USA, pp. 1049-1050.

Iddan, et al., "3D Imaging in the Studio (And Elsewhere . . . )", Proceedings of the SPIE, SPIE, Bellingham, VA, US, vol. 4298, Jan. 24, 2001, pp. 48-55, XP008005351.

Jojic, et al., "Tracking Self-Occluding Articulated Objects in Dense Disparity Maps", Computer Vision, 1999, The Proceedings fo the Seventh IEEE International Conference on Kerkyra, Greece Sep. 20-27, 1999, Los Alamitos, CA, US, IEEE Computer Society, US, Sep. 20, 1999, (Sep. 20, 1999), pp. 123-130.

Klinker, et al., "Distributed User Tracking Concepts for Augmented Reality Applications", pp. 37-44, Augmented Reality, 2000, IEEE and ACM Int'l Symposium, Oct. 2000, XPOI0520308, ISBN: 0/7695-0846-4, Germany.

Nakagawa, et al., "A Collision Detection and Motion Image Synthesis Between a Background Image and a Foreground 3-Dimensional Object", TVRSJ Bol. 4, No. 2, pp. 425-430, 1999, Japan.

Mihara, et al., itA Realtime Vision-Based Interface Using Motion Processor and Applications to Robotics, vol. J84-D-I1, No. 9, pp. 2070-2078, 0912001, Japan.

Nakamura, et al., "A Consideration on Reconstructing 3-D Model Using Object Views", 2004-01601-003, pp. 17-21, Kokkaido University, Japan, nakamura@media.eng.hokudai.ac.jp.

Nishida, et al., "A Method of Estimating Human Shapes by Fitting the Standard Human Model to Partial Measured Data", D-II vol. J84-D-II, No. 7, pp. 1310-1318, Jul. 2001.

Wilson & Darrell, "Audio-Video Array Source Localization for Intelligent Environments", 2002 IEEE Dept. of Electrical Eng and Computer Science, MIT, Cambridge, MA 02139.

(56) References Cited

OTHER PUBLICATIONS

Fiala, et al., "A Panoramic Video and Acoustic Beamforming Sensor for Videoconferencing", 2004 IEEE, Computational Video Group, National Research Council, Ottawa, Canada KIA OR6.
Hemmi, et al., "3-D Natural Interactive Interface-Using Marker Tracking from a Single View",Sep. 9, 1991, Systems and Computers in Japan.
Lanier, Jaron, "Virtually there: three-dimensional tele-immersion may eventually bring the world to your desk", Scientific American, ISSN: 0036-8733, Year: 2001.
Richardson et al., "Virtual Network Computing" IEEE Internet Computing, vol. 2, No. 1 Jan./Feb. 1998.
Fujitsu, "Internet Development of Emulators" Abstract, Mar. 1997, vol. 48, No. 2.
Kanade, et al., "A Stereo Machine for Video-rate Dense Depth Mapping and Its New Application" 1996, CVPR 96, IEEE Computer Society Conference, pp. 196-202 (022).
Gvili, et al., "Depth Keying", SPIE vol. 5006 (2003), 2003 SPIE-IS&T, pp. 564-574.
Notification of Transmittal of International Search Report and Written Opinion issued in International Application No. PCT/US05/27456, dated May 8, 2007 (10 total pages).

\* cited by examiner

USING A PORTABLE DEVICE TO INTERFACE WITH A VIDEO GAME RENDERED ON A MAIN DISPLAY

CLAIM OF PRIORITY

This application is a continuation of and claims priority from U.S. patent application Ser. No. 10/922,514 filed on Aug. 19, 2004 and entitled "PORTABLE AUGMENTED REALITY DEVICE AND METHOD", which is incorporated herein by reference in its entirety.

BACKGROUND OF THE INVENTION

1. Field of the Invention

This invention relates generally to augmented reality applications and more particularly to combining image recognition features with augmented reality applications in order to enrich the augmented reality applications.

2. Description of the Related Art

Augmented reality (AR) attempts to enrich a user's real environment by adding spatially aligned virtual objects (3D models, 2D textures, textual annotations, etc.) to the user's environment. The goal is to create the impression that the virtual object is a part of the real environment. The users of the AR system experience the augmented environment through special display devices that are typically worn on the body, e.g., head mounts.

Current augmented reality systems suffer from issues with general registration problems, i.e., getting the computer graphics to stick to a real-world scene. For example, due to the use of multiple sensors, artifacts, such as miss-movement of the computer graphics with the real-world scene may occur. These artifacts are due to the multiple sensors having different speeds. Additionally, delays between the head tracking system and the camera used to capture the real-world scene along with the need to merge the computer graphics into the real-world scene, cause misalignment/registration problems. These registration problems may even become serious enough to cause a user to become uncomfortable when viewing the image. Additionally, the augmented reality systems tend to be complex systems that are not portable. Accordingly, there are no viable consumer applications for these augmented reality systems.

As a result, there is a need to solve the problems of the prior art to provide a method and apparatus for providing a portable device capable of providing an augmented reality experience.

SUMMARY OF THE INVENTION

Broadly speaking, the present invention fills these needs by providing a method and device for providing an enhanced shopping experience using a portable device. It should be appreciated that the present invention can be implemented in numerous ways, including as a method, a system, computer readable media or a device. Several inventive embodiments of the present invention are described below.

In one embodiment, a portable device configured to provide enhanced shopping information is included. The portable device has a display screen and an image capture device and the portable device is configured to access databases through a wireless network. The portable device includes image recognition logic that is configured to perform analysis of an image of an object that includes a bar code associated with a product. The analysis determines if the graphics found on the object corresponds to a bar code and a portion of the image with the bar code is communicated through the wireless network to databases to identify the product. The portable device further includes image generation logic that is configured to obtain product information for the identified product from the databases and present the product information on the display screen of the portable device.

In another embodiment, a method for obtaining product information through a portable device is provided. An image of an object including a bar code associated with a product is captured using an image capture device. The captured image is analyzed to determine if graphics found on the object correspond to a bar code. A portion of the image with the bar code is transmitted to databases through a wireless network and the product associated with the bar code is identified. Product information from the databases is obtained and presented through image generation logic incorporated into the portable device. The presented product information defines multimedia data in a graphical user interface that includes one of an image or text information about the product.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

Figure 1:
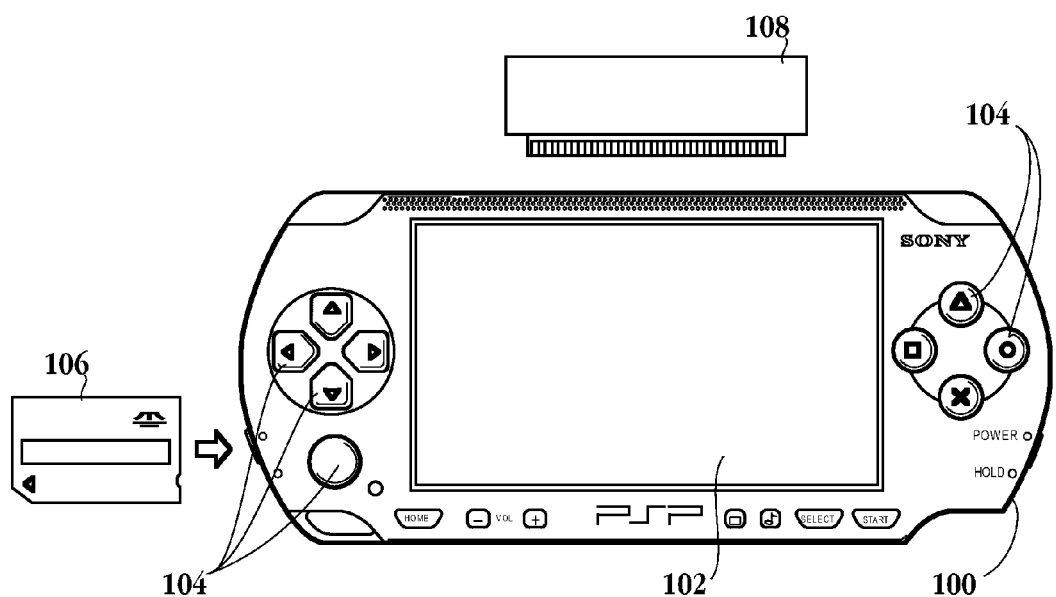
FIG. 1 is a simplified schematic diagram of a device having image capture capability, which may be used in an augmented reality application in accordance with one embodiment of the invention.

An invention is described for a system, device and method that provide an enhanced augmented reality environment. It will be obvious, however, to one skilled in the art, that the present invention may be practiced without some or all of these specific details. In other instances, well known process operations have not been described in detail in order not to unnecessarily obscure the present invention.

The embodiments of the present invention provide a system and method for enabling a low cost consumer application related to augmented reality for entertainment and informational purposes. In one embodiment, a portable device with a display, a camera and software configured to execute the functionality described below is provided. One exemplary illustration of the portable device is the PLAYSTATION PORTABLE (PSP) entertainment product combined with a universal serial bus (USB) 2.0 camera attachment and application software delivered on a universal media disk (UMD) or some other suitable optical disc media. However, the invention could also apply to cell phones with cameras or PDAs with cameras. In another embodiment, the portable device can be further augmented through use of wireless networking which is a standard option on the PSP. One skilled in the art will appreciate that Augmented Reality (AR) is a general term for when computer graphics are mixed with real video in such a way as the computer graphics adds extra information to the real scene.

In one aspect of the invention a user points the portable device having a display and a camera at a real world scene. The camera shows the scene on the portable device such that it seems that the user is seeing the world through the device. Software stored on the device or accessed through wireless network displays the real world image, and uses image processing techniques to recognize certain objects in the camera's field of vision. Based on this recognition, the portable device constructs appropriate computer graphics and overlays these graphics on the display device on top of the real world image.

As the device is a portable hand held device with limited computing resources, certain objects may be used so that the image recognition software can recognize the object with relative ease, i.e., in manner suitable for the limited processing capabilities of the portable device. Some exemplary objects are listed below. It should be appreciated that this list is not exhaustive and other objects that are recognizable may be used with the embodiments described herein.

Collectable or regular playing cards are one suitable object. In one embodiment, the playing cards have a fixed colored design in high contrast. The design graphics are easy for the device to recognize through the image recognition software. In addition, the graphics may be chosen so that the device can easily determine the orientation of the card. The portable device can then take the real image, remove the special recognized graphic and replace it with a computer-generated image and then show the resulting combination of real and computer graphics to the user on the display. As the card or the camera moves, the computer graphics move in the same way. In one embodiment, an animating character could be superimposed on the card. Alternatively, a book could be used. Similar to the cards, a clear design is used and then the portable device overlays registered computer graphics before displaying the scene to the user.

In another embodiment, the clear graphic images can be displayed on a television (TV) either from a computer game, the Internet or broadcast TV. Depending upon the software application on the device, the user would see different superimposed computer graphics on the portable display as described further below.

In yet another embodiment, a user with the device can get additional product information by analyzing the standard bar code with the camera attachment. The additional product information may include price, size, color, quantity in stock, or any other suitable physical or merchandise attribute. Alternatively, by using a special graphic design recognized by the portable device, graphics can be superimposed on the retail packaging as seen by the portable device. In addition, through a wireless network of the store in which the merchandise is located, catalogue information may be obtained about the merchandise. In one embodiment, the image data captured by the portable device is used to search for a match of the product through a library of data accessed through the wireless network. It should be appreciated that the embodiments described herein enable a user to obtain the information from a bar code without the use of special purpose laser scanning equipment. The user would also own the device and could take it from store to store. This would enable the user to do comparison-shopping more easily. Also, the device would be capable of much richer graphics than bar code scanners available in-store. In one embodiment, retailers or manufacturers could provide optical disc media with catalogues of product information. The user would put the disc in the device and then point the camera at a bar code and they would see detailed product information.

With respect to music and video, the bar code would enable the portable device to access a sample of the music and play so the user can effectively listen to a part of the CD simply by capturing an image of the bar code. Similarly, for DVD and VHS videos, a trailer can be stored in the product catalogue on the removable media of the device. This trailer can be played back to the user after they capture the bar code and the portable device processes the captured image and matches it to the corresponding trailer associated with the bar code. Likewise, a demo of a video game could be played for video game products. It should be appreciated that there are other possible uses including product reviews, cross promotions, etc. Furthermore, it should be appreciated that the portable device is not scanning the bar code as conventional scanners. The portable device performs image processing on a captured image of the bar code and matches it with a corresponding image to access the relevant data. Furthermore, with an in-store wireless networked and a portable device like the PSP (which is wireless network enabled), there is no need for a special removable disc media catalogue. Here, the catalogue can be provided directly by the in-store wireless network.

In another embodiment, the portable device may be used as a secondary personal display in conjunction with a main display that is shared by several users. For example, several people may play a video game on a single TV and use the portable devices for additional information that is unique for each player. Likewise, for broadcast TV (e.g. game show) where several people in the home watch a single broadcast, but see different personal information on their portable device depending upon their preferences. The portable device may be used to obtain additional information from the main display. For example, with respect to a sports game, additional player information or statistics may be displayed for a selected player. It may be necessary to synchronize the graphics on the main display with those on the portable display. One approach is to use a wireless network or broadcast and to send information to each display using this network. An alternative method is to use visual cues from the main display to drive the synchronization with the portable display. As such no additional expensive network connections are required.

FIG. 1 is a simplified schematic diagram of a device having image capture capability, which may be used in an augmented reality application in accordance with one embodiment of the invention. Portable device 100 includes navigation buttons 104 and display screen 102. Device 100 is capable of accepting memory card 106 and image capture device 108. Image capture device 108 may include a charge couple device (CCD) in order to capture an image of a real-world scene. Alternatively, the camera functionality may be provided by a complimentary metal oxide semiconductor chip that uses an active pixel architecture to perform camera functions on-chip. In one embodiment, device 100 is a PSP device having image capture capability.

Figure 2A:
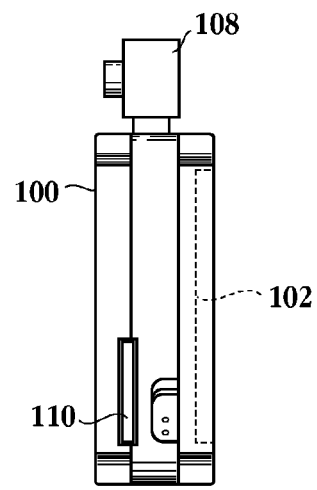
FIGS. 2A and 2B are side views of the portable device illustrated in FIG. 1.
Figure 2B:
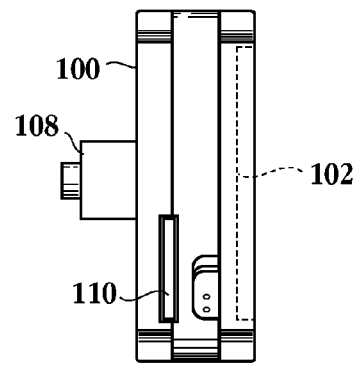

FIGS. 2A and 2B are side views of the portable device illustrated in FIG. 1. FIG. 2A shows device 100 with memory card slot 110 and display panel 102. Image capture device 108 is located on a top surface of device 100. It should be appreciated that image capture device 108 may be a pluggable device or may be hard-wired into device 100. FIG. 2B illustrates an alternative embodiment of device 100 of FIG. 1. Here, image capture device 108 is located on a backside of device 100. Therefore, a user viewing the display screen 102 may have the same viewing angle as image capture device 108. As illustrated, device 100 of FIG. 2B also includes memory card slot 110. It should be appreciated that the memory card may be interchanged between users in order to swap information with other users.

Figure 3:
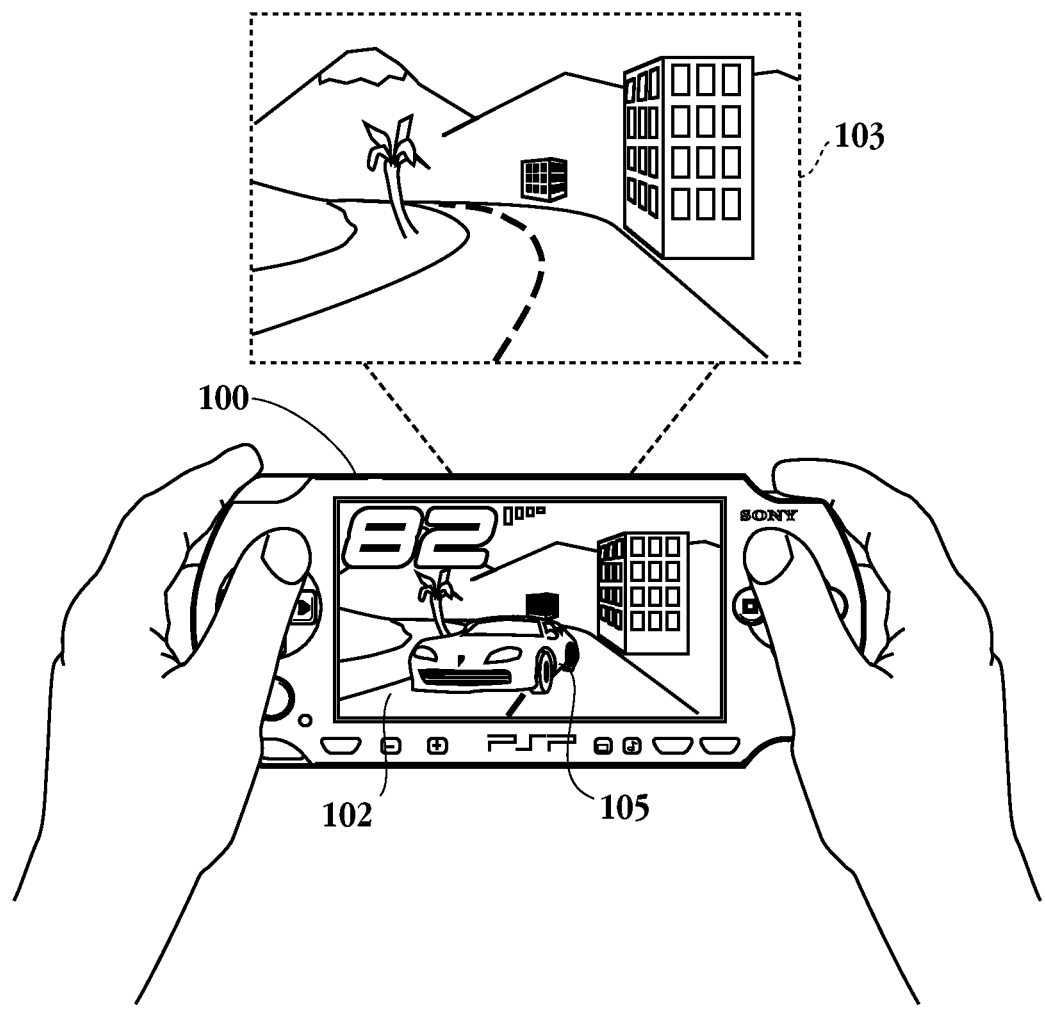
FIG. 3 is a simplified schematic diagram of an image capture device being utilized in an augmented reality application in accordance with one embodiment of the invention.

FIG. 3 is a simplified schematic diagram of an image capture device being utilized in an augmented reality application in accordance with one embodiment of the invention. Here, device 100 is being held by a user with a real-world scene 103 being augmented with computer graphics on display screen 102. Real-world scene 103 includes a street bordering buildings having mountain scenery in the background. The computer graphics incorporated into real-world scene 103 is car 105. In one embodiment, logic within the portable device recognizes the road or a marker on the road, e.g., the dividing line of the road, and incorporates the car into the scene. It should be appreciated that while a PLAYSTATION PORTABLE device is illustrated in FIGS. 1-3 the embodiments described herein may be incorporated into any handheld device having camera capability. Other suitable devices include a cell phone, a personal digital assistant, a web tablet, and a pocket PC.

Figure 4:
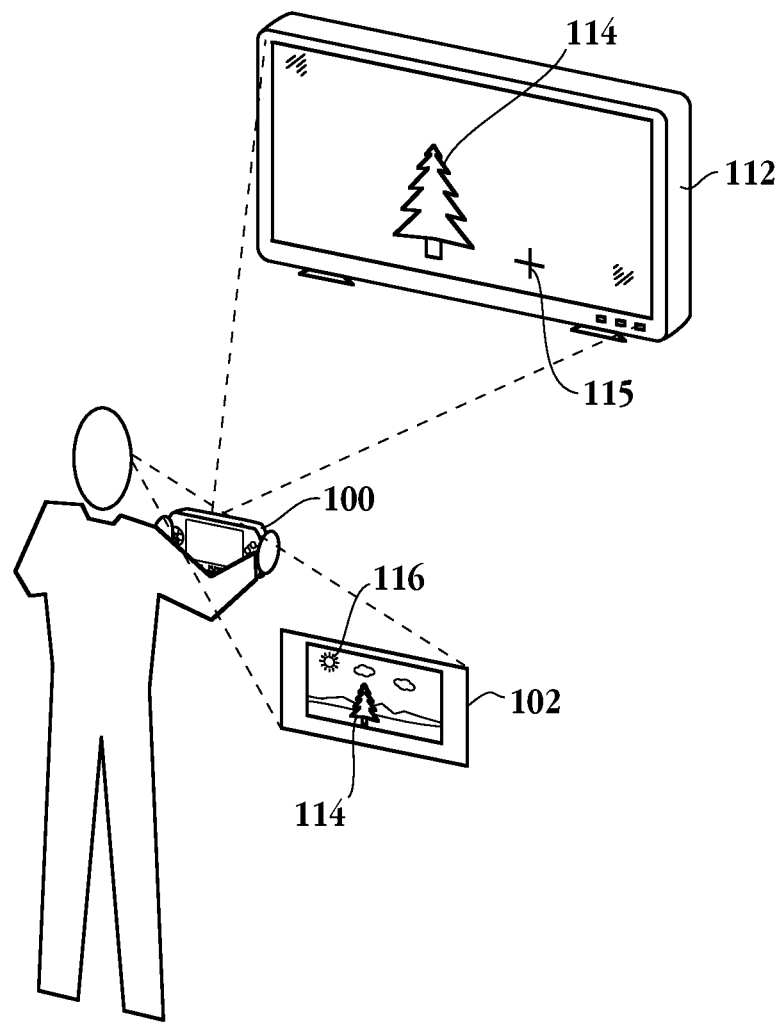
FIG. 4 is a simplified schematic diagram illustrating yet another application of the incorporation of computer graphics into a real world scene in accordance with one embodiment of the invention.

FIG. 4 is a simplified schematic diagram illustrating yet another application of the incorporation of computer graphics into a real world scene in accordance with one embodiment of the invention. Here, a user is holding portable device 100, which includes display 102. It should be noted that display 102 is expanded relative to device 100 for ease of explanation. An image capture device, which is incorporated into device 100, captures a scene being displayed on display device 112, which may be a television. Here, display device 112 illustrates a tree 114 being shown. Device 100 captures the image being displayed on device 112 and displays tree 114 on display screen 102. In addition to tree 114 being shown on display screen 102, device 100 incorporates additional objects into the scene. For example, sun 116 is incorporated into the scene being displayed on display screen 102. As described above, a marker, such as marker 115 of the first display device, may cause the incorporation of additional objects such as sun 116 into the second display device. It should be appreciated that device 100 includes a logic capable of recognizing objects such as tree 114 or marker 115 and thereafter responding to the recognition of such objects or markers by adding appropriate computer graphics such as sun 116 into the scene being displayed on device 100. Furthermore, the image capture device incorporated into portable device 100 may be a video capture device that continuously captures the changing frames on display device 112 and incorporates additional objects accordingly. As mentioned above, visual cues from the main display may be used to drive the synchronization with the portable display.

Figure 5:
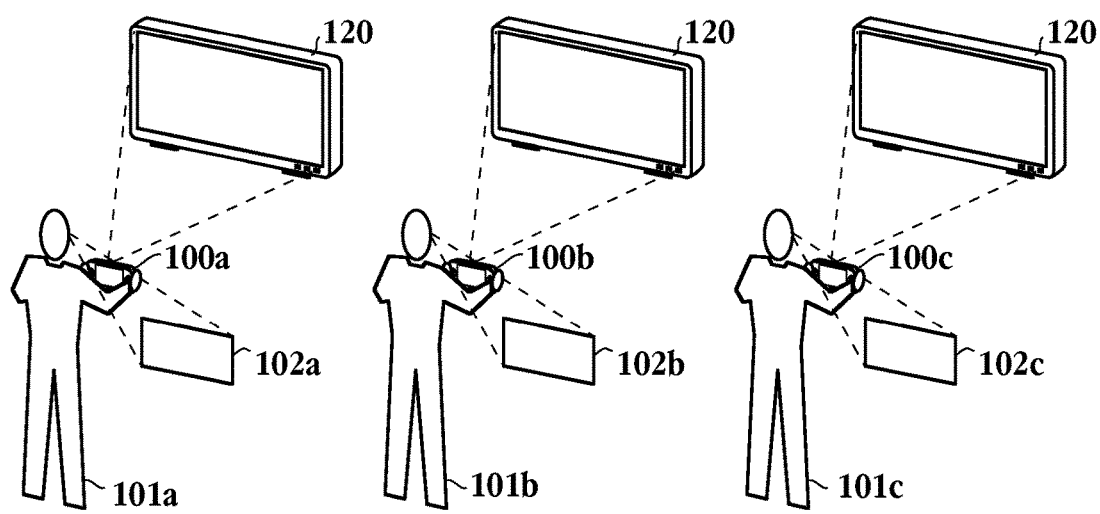
FIG. 5 is a simplified schematic diagram showing the plurality of users viewing a display monitor with a handheld device in accordance with one embodiment of the invention.

FIG. 5 is a simplified schematic diagram showing the plurality of users viewing a display monitor with a handheld device in accordance with one embodiment of the invention. Here, display device 120 is a single display device but is illustrated three different times for ease of explanation. Users 101a through 101c have corresponding handheld portable devices 100a through 100c, respectively. It should be appreciated that a game show, computer game, sporting event or some other suitable display may be being presented on display screen 120. Display devices 100a, 100b, and 100c capture the image being displayed on display screen 120 and augment image data or graphics into the captured image in order to provide additional information to users 101a through 101c. In one embodiment, a game show being displayed on display device 120 is being viewed by each of users 101a through 101c, so that users 101a through 101c may compete with each other. In another embodiment, the display on display screen 120, which is captured by devices 100a through 100c, includes data which may be analyzed by logic within device 100a through 100c so that each of the users see somewhat different displays on the corresponding display screens. For example, with reference to a game of charades, one of the users 101a through 101c may have access to what the answer is while the other users do not have this access. In this embodiment, the television broadcast system may be used to incorporate extra data into the display data being shown by display 120 in order to provide extra functionality for users 101a through 101c. In essence, devices 100a through 100c enable extra data in the image being displayed on display 120 to be turned on. The extra data may be triggered by graphics within display 120 which are recognized by image recognition logic of the portable device.

Figure 6A:
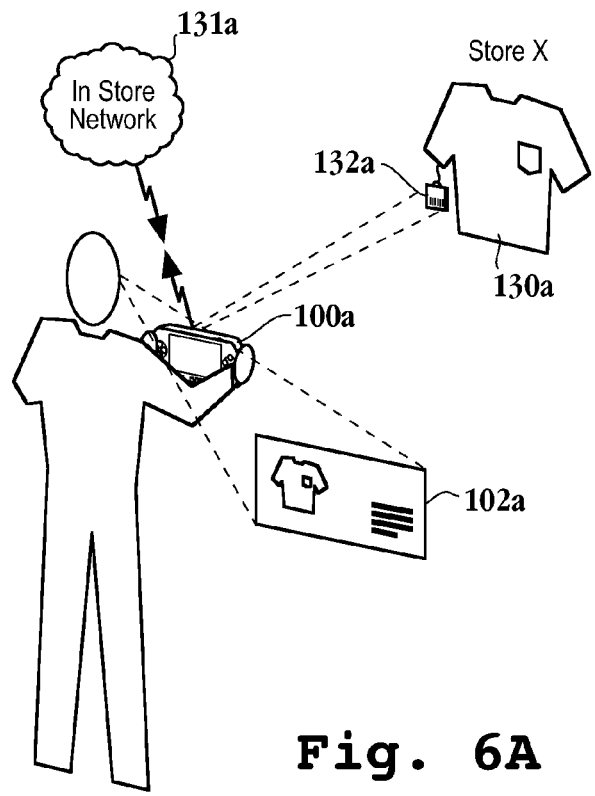
FIGS. 6A and 6B show yet another application of the use of a portable device capable of recognizing graphical data in accordance with one embodiment of the invention.
Figure 6B:
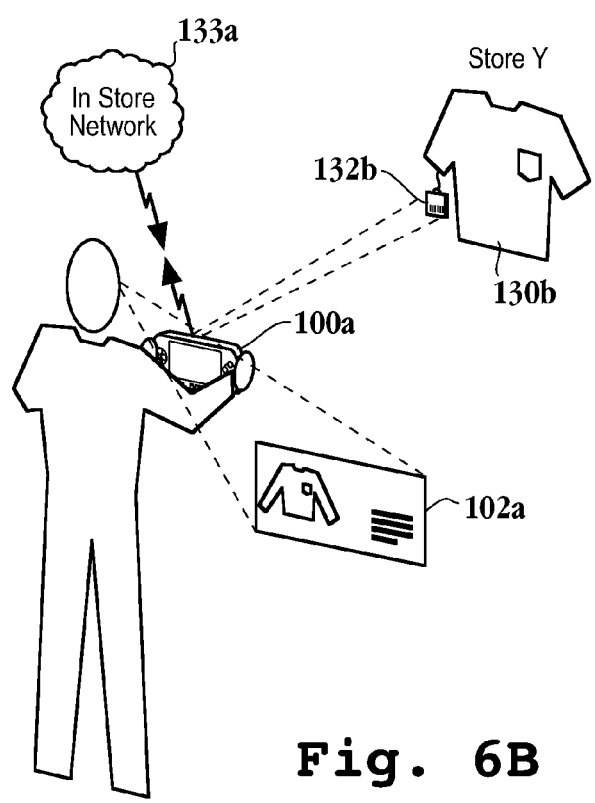

FIGS. 6A and 6B show yet another application of the use of a portable device capable of recognizing graphical data in accordance with one embodiment of the invention. Here, a user has a portable device 100a with display screen 102a. As mentioned above, display screen 102a is enlarged for ease of explanation. Device 100a is capable of being networked to in-store network 131a. Device 100a captures an image of a barcode 132a associated with product 130a. By recognizing barcode 132a and communicating with in-store network 131a wirelessly, device 100a is enabled to download information concerning the characteristics of item 130a. It should be appreciated that in place of barcode 132a device 100a may recognize a storage box containing item 130a or item 130a itself. Then, by communicating with in-store network 131a, a comparison of the captured image data with a library from in-store network 131a device 100a is able to locate the characteristics such as price, size, color, etc., of item 130a. The user then may move to store Y and use device 100a to download characteristics associated with item 130b. Here again, a barcode 132*b* or image data of item 130*d* or its storage container may be used to access the item characteristics, which can be any catalogue characteristics from in-store network 133*a*. From this data, the user is then able to compare the characteristics of item 130*a* in store X and 130*b* in store Y. Thus, where item 130*a* and 130*b* are the same items, the user is able to perform comparison-shopping in the different locations.

Figure 7:
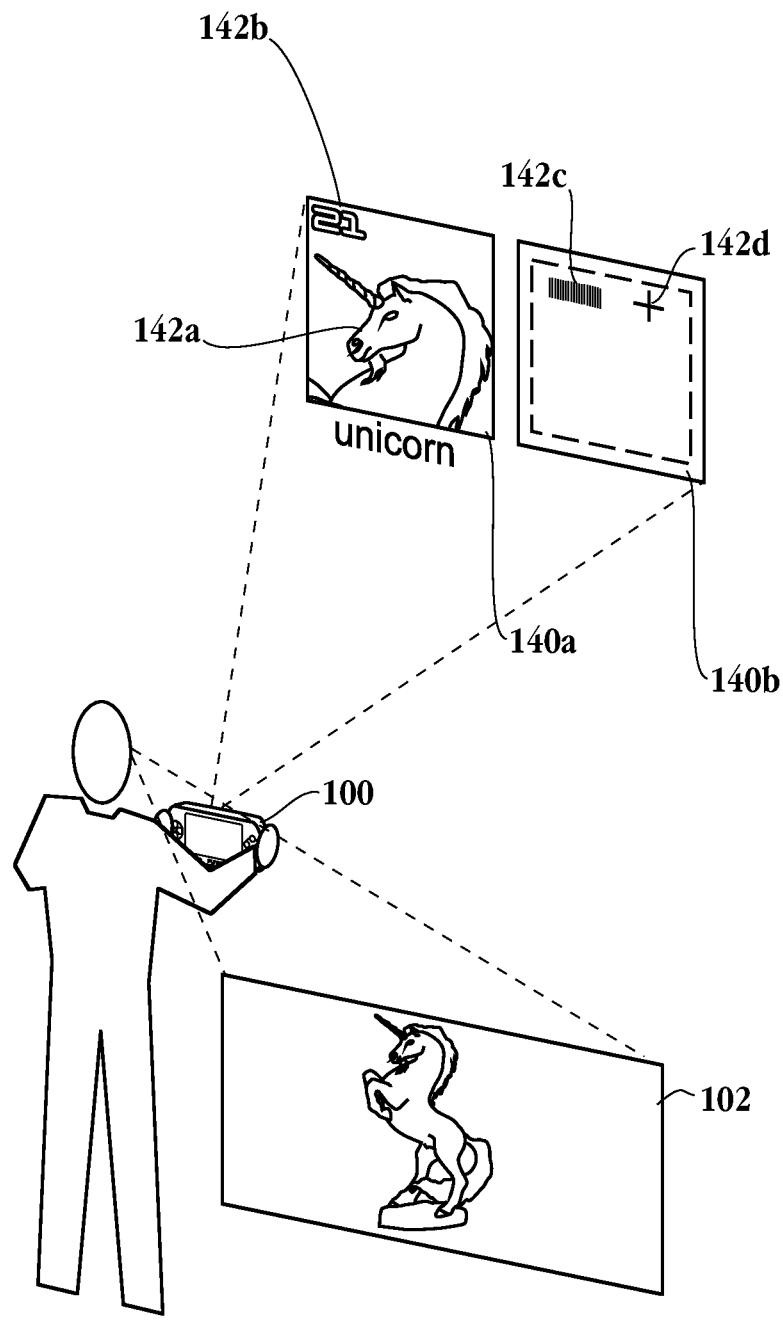
FIG. 7 is a simplified schematic diagram illustrating the use of a portable device and a card game application in accordance with one embodiment of the invention

FIG. 7 is a simplified schematic diagram illustrating the use of a portable device and a card game application in accordance with one embodiment of the invention. Here, the user is pointing device 100 toward cards 140*b* and 140*b*. The cards 140 and 140*b* may have symbols or some kind of graphical data, which is recognized by logic within device 100. For example, cards 140*a* has image 142*a* and numbers 142*b*, which may be recognized by image device 100. Card 140*b* includes barcode 142*c* and marker 142*d* which also may be recognized by device 100. In one application, these markings may indicate the value of the cards in order to determine which card is the highest. Once each of the images/markings of cards 140*a* and 140*b* are processed by the logic within device 100, a simulated fight may take place on display screen 102 where the winner of the fight will be associated with the higher of cards 140*a* and 140*b*. With respect to collectable cards, by using portable device 100 and a special recognizable design on the card (possibly the back of the card), a new computer generated graphic can be superimposed on the card and displayed on the portable display. For example, for sports cards, the sports person or team on the card can be superimposed in a real 3D view and animated throwing the ball, etc. For role-playing games, it is possible to combine the cards and a video game on the portable device so that collecting physical cards becomes an important part of the game. In this case, a character of the game may be personalized by the player and this information could be swapped with other players via wireless network or via removable media (e.g. Memory Stick).

A similar technique could be used to augment business cards. In addition to the normal printed material on a business (or personal) card, a special identifying graphic could be included. This graphic can be associated with the individual and will reference information about that person potentially including photos, video, audio as well as the normal contact info. The personal information could be exchanged via removable media. In another embodiment a unique graphic is indexed an on-line database via a wireless network to get the information about that person. Having accessed the information, a superimposed graphic, e.g., the person's photo, can be created in place of the graphic on the portable display.

Figure 8:
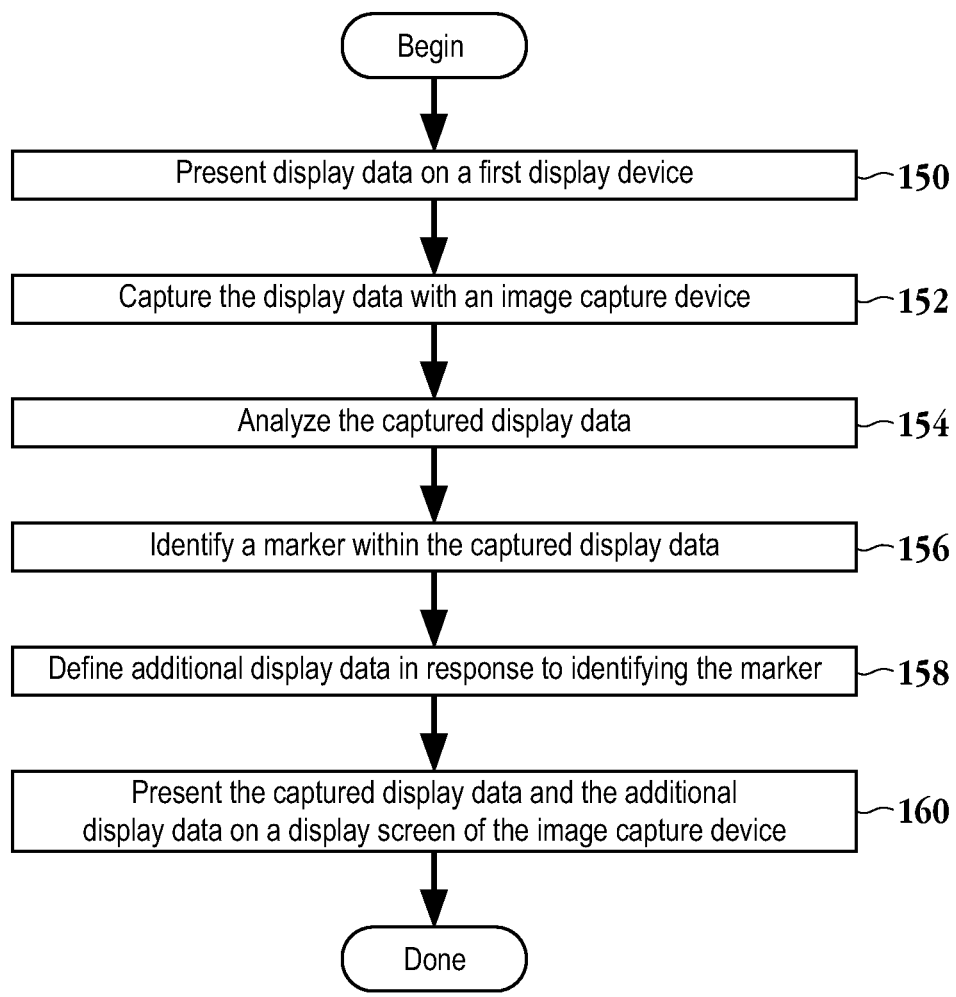
FIG. 8 is a flow chart illustrating the method operations for augmenting display data presented to a viewer in accordance with one embodiment of the invention.

FIG. 8 is a flow chart illustrating the method operations for augmenting display data presented to a viewer in accordance with one embodiment of the invention. The method initiates with operation 150 where the display data on a first display device is presented. Here, the display is shown on a television, computer monitor or some other suitable display device. Then in operation 152, the display data on the display device is captured with an image capture device. For example, the portable device having image capture capability discussed above is one exemplary device having image capture capability, which includes video capture capability. The captured display data is then analyzed in operation 154. This analysis is performed by logic within the portable device. The logic includes software or hardware or some combination of the two. In operation 156 a marker within the captured display data is identified. The marker may be a any suitable marker, such as the markers illustrated in FIGS. 4 and 7. In operation 158 additional display data is defined in response to identifying the marker. The additional display data is generated by image generation logic of the portable device. Alternatively, the additional data may be downloaded from a wireless network. The captured display data and the additional display data are then presented on a display screen of the image capture device in operation 160.

Figure 9:
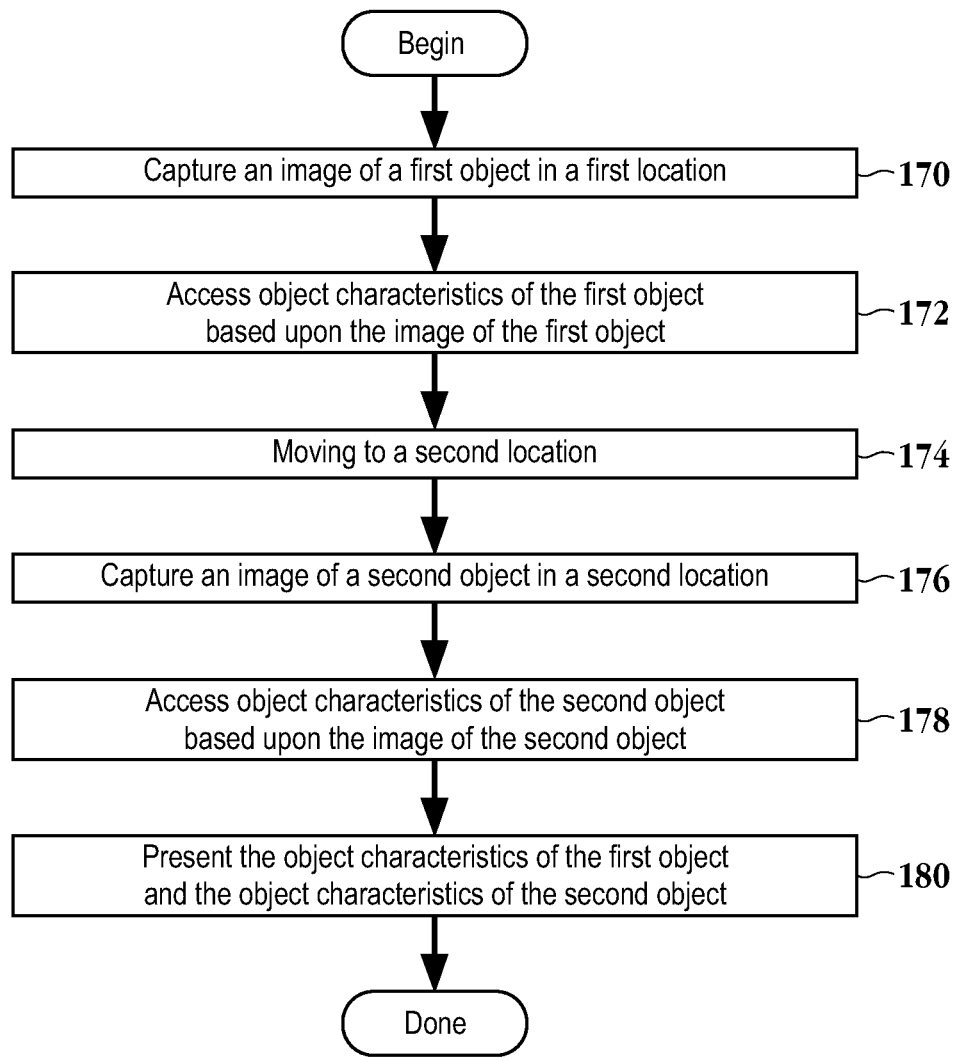
FIG. 9 is a flow chart illustrating the method operations for providing information in a portable environment in accordance with one embodiment of the invention.

FIG. 9 is a flow chart illustrating the method operations for providing information in a portable environment in accordance with one embodiment of the invention. The method initiates with operation 170 where an image of a first object is captured in a first location. For example, an image of an item in a first store may be captured here. In operation 172 the object characteristics of the first object are accessed based upon the image of the first object. For example, a wireless network may be accessed within the store in order to obtain the object characteristics of the first object. Then, in operation 174 the user may move to a second location. In operation 176 an image of a second object in the second location is captured. The object characteristics of the second object are accessed based upon the image of the second object in operation 178. It should be appreciated that in operations 172 and 178 the image data is used to access the object characteristics and not laser scan data. In operation 180 the object characteristics of the first object and the object characteristics of the second object are presented to a user. Thus, the user may perform comparison shopping with the use of a portable device based upon the recognition of video image data and the access of in-store networks.

Figure 10:
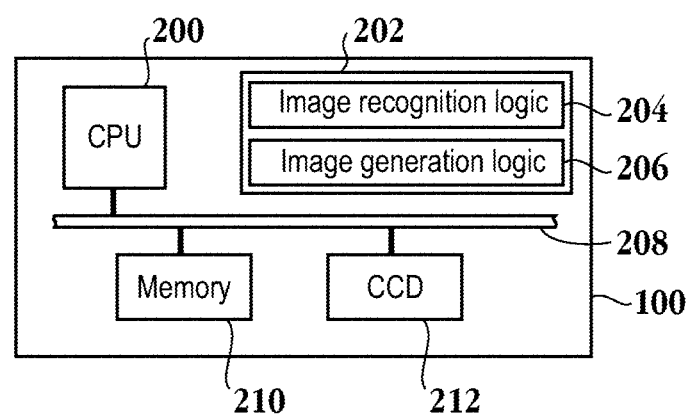
FIG. 10 is a simplified schematic diagram illustrating the modules within the portable device in accordance with one embodiment of the invention.

FIG. 10 is a simplified schematic diagram illustrating the modules within the portable device in accordance with one embodiment of the invention. Portable device 100 includes central processing unit (CPU) 200, augmented reality logic block 202, memory 210 and charged couple device (CCD) logic 212. As mentioned above, a complimentary metal oxide semiconductor (CMOS) image sensor may perform the camera functions on-chip in place of CCD logic 212. One skilled in the art will appreciate that a CMOS image sensor draws less power than a CCD. Each module is in communication with each other through bus 208. Augmented reality logic block 202 includes image recognition logic 204 and image generation logic 206. It should be appreciated that augmented reality logic block 202 may be a semiconductor chip incorporating the logic to execute the functionality described herein. Alternatively, the to functionality described with respect to augmented reality logic block 202, image recognition logic 204 and image generation logic 206 may be performed in software. Here the code may be stored within memory 210.

In summary, the above-described invention describes a portable device capable of providing an enriched augmented reality experience. It should be appreciated that while the markers and graphics that are recognized by the system are computer generated, the invention is not limited to computer-generated markers. For example, a set of pre-authored symbols and a set of user definable symbols can be created which can be recognized even when drawn by hand in a manner recognizable to the camera of the image capture device. In this way, players could create complex 3D computer graphics via drawing simple symbols. In one embodiment, a player might draw a smiley face character and this might be recognized by the device and shown on the display as a popular cartoon or game character smiling With user definable designs, users can also establish secret communications using these symbols.

With the above embodiments in mind, it should be understood that the invention may employ various computer-implemented operations involving data stored in computer systems. These operations include operations requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The above-described invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a communications network.

The invention can also be embodied as computer readable code on a computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A method for interfacing with a video game, comprising:
    rendering display data on a main display, the display data defining a scene rendered by the video game, the display data being configured to include a visual cue;
    capturing the display data by an image capture device incorporated into a portable device while being directed toward the main display to enable the capturing;
    analyzing the captured display data to identify the visual cue as depicted in the scene of the video game as depicted in the display data;
    in response to identification of the visual cue, determining additional information that is in addition to the scene of the video game that is displayed on the main display, the additional information defining graphics or text to be added to the scene of the video game;
    presenting the additional information on a personal display incorporated into the portable device, the presentation of the additional information being synchronized to the rendering of the display data on the main display, the synchronization being driven by the identification of the visual cue.

2. The method of claim 1, wherein the image capture device is a video capture device configured to continuously capture changing frames defined by the display data as it is rendered on the main display, wherein the additional information presented on the personal display is updated accordingly based on identification of the visual cue or additional visual cues defined in the changing frames by the display data.

3. The method of claim 1, wherein the visual cue is defined by an object of the video game or a marker.

4. The method of claim 1, wherein the additional information defines at least one additional object of the video game.

5. The method of claim 1, wherein determining the additional information includes receiving the additional information over a wireless connection by the portable device.

6. The method of claim 1, wherein determining the additional information includes generating the additional information by the portable device.

7. The method of claim 1, wherein presenting the additional information includes incorporating the graphics into the scene of the video game to provide extra functionality for the video game.

8. The method of claim 1, wherein determining additional information includes accessing a user preference setting defined for a user of the portable device, the additional information being defined based on the user preference setting.

9. A method for interfacing with a video game, comprising:
    rendering display data on a main display, the display data defining a scene rendered by the video game, the display data being configured to include a visual cue;
    capturing the display data by a first image capture device incorporated into a first portable device while being directed toward the main display to enable the capturing;
    analyzing the captured display data of the first image capture device to identify the visual cue as depicted in the scene of the video game as depicted in the display data, and, in response to identification of the visual cue, determining first additional information that is in addition to the scene of the video game that is displayed on the main display, the first additional information defining graphics or text to be added to the scene of the video game;
    presenting the first additional information on a first personal display incorporated into the first portable device, the presentation of the first additional information being synchronized to the rendering of the display data on the main display, the synchronization being driven by the identification of the visual cue;
    capturing the display data by a second image capture device incorporated into a second portable device while being directed toward the main display to enable the capturing;
    analyzing the captured display data of the second image capture device to identify the visual cue as depicted in the scene of the video game as depicted in the display data, and, in response to identification of the visual cue, determining second additional information that is in addition to the scene of the video game that is displayed on the main display, the second additional information defining graphics or text to be added to the scene of the video game, the second additional information being different from the first additional information;
    presenting the second additional information on a second personal display incorporated into the second portable device, the presentation of the second additional information being synchronized to the rendering of the display data on the main display, the synchronization being driven by the identification of the visual cue.

10. The method of claim 9,
wherein the first image capture device is a first video capture device configured to continuously capture changing frames defined by the display data as it is rendered on the main display, wherein the first additional information presented on the first personal display is updated accordingly based on identification of the visual cue or additional visual cues defined in the changing frames by the display data;
wherein the second image capture device is a second video capture device configured to continuously capture the changing frames defined by the display data as it is rendered on the main display, wherein the second additional information presented on the second personal display is updated accordingly based on identification of the visual cue or additional visual cues defined in the changing frames by the display data.

11. The method of claim 9, wherein the visual cue is defined by an object of the video game or a marker.

12. The method of claim 9, wherein the first additional information or the second additional information defines at least one additional object of the video game.

13. The method of claim 9, wherein determining the first additional information or the second additional information includes receiving the additional information over a wireless connection by the first portable device or the second portable device, respectively.

14. The method of claim 9, wherein determining the first additional information or the second additional information includes generating the first additional information or the second additional information, respectively, by the first portable device or the second portable device, respectively.

15. The method of claim 9, wherein presenting the first additional information or the second additional information includes incorporating the graphics or text of the first additional information, or the graphics or text of the second additional information, respectively, into the scene of the video game to provide extra functionality for the video game.

16. The method of claim 9, wherein determining the first additional information or the second additional information includes accessing a user preference setting defined for a user of the first portable device or the second portable device, respectively, the first additional information or the second additional information being respectively defined based on the user preference setting.

17. A portable device for interfacing with a video game, comprising:
an image captured device configured to capture display data rendered on a main display while being directed toward the main display to enable the capturing, the display data defining a scene rendered by the video game, the display data being configured to include a visual cue;
image recognition logic configured to analyze the captured display data to identify the visual cue as depicted in the scene of the video game as depicted in the display data;
image generation logic, configured in response to identification of the visual cue, to determine additional information that is in addition to the scene of the video game that is displayed on the main display, the additional information defining graphics or text to be added to the scene of the video game;
a personal display configured to present the additional information, the presentation of the additional information being synchronized to the rendering of the display data on the main display, the synchronization being driven by the identification of the visual cue.

18. The portable device of claim 17, wherein the image capture device is a video capture device configured to continuously capture changing frames defined by the display data as it is rendered on the main display, wherein the additional information presented on the personal display is updated accordingly based on identification of the visual cue or additional visual cues defined in the changing frames by the display data.

19. The portable device of claim 17, wherein the image generation logic is configured to determine the additional information by receiving the additional information over a wireless connection or by generating the additional information at the portable device.

20. The portable device of claim 17, further comprising:
a head mount for enabling the portable device to be worn by a user.

21. A method for interfacing with a video game, comprising:
capturing display data, rendered on a main display, using an image capture device incorporated into a portable device while being directed toward the main display to enable the capturing, the display data defining a scene rendered by the video game, the display data being configured to include a visual cue;
analyzing the captured display data to identify the visual cue as depicted in the scene of the video game as depicted in the display data;
in response to identification of the visual cue, determining additional information that is in addition to the scene of the video game that is displayed on the main display, the additional information including graphics or text related to the scene of the video game;
presenting the additional information on a display of the portable device, the presentation of the additional information being responsive to the identification of the visual cue.

22. The method of claim 21, wherein the image capture device is a video capture device configured to continuously capture changing frames defined by the display data as it is rendered on the main display, wherein the additional information presented on the personal display is updated accordingly based on identification of the visual cue or additional visual cues defined in the changing frames by the display data.

23. The method of claim 21, wherein the visual cue is defined by an object of the video game or a marker.

24. The method of claim 21, wherein the additional information includes at least one additional object of the video game.

25. The method of claim 21, wherein determining the additional information includes receiving the additional information over a wireless connection by the portable device.

26. The method of claim 21, wherein determining the additional information includes generating the additional information by the portable device.

27. The method of claim 21, wherein determining additional information includes accessing a user preference setting defined for a user of the portable device, the additional information being defined based on the user preference setting.

* * * * *